United States Patent [19]
Coudurier

[11] Patent Number: 5,357,850
[45] Date of Patent: Oct. 25, 1994

[54] COOKING VESSEL HAVING A BASE WHICH IS NON-DEFORMABLE UNDER THE ACTION OF HEAT

[75] Inventor: Alain Coudurier, Albens, France

[73] Assignee: Seb S.A., Selongey, France

[21] Appl. No.: 67,173

[22] Filed: May 26, 1993

Related U.S. Application Data

[63] Continuation of Ser. No. 776,399, Nov. 21, 1991, abandoned.

[30] Foreign Application Priority Data

Mar. 30, 1990 [FR] France ............................... 90 04096
Oct. 5, 1990 [FR] France ............................... 90 12301

[51] Int. Cl.$^5$ ..................... A47J 27/00; A47J 36/02; A47J 37/10
[52] U.S. Cl. ................. 99/422; 99/DIG. 15; 126/390; 220/912
[58] Field of Search ............... 99/422, 425, 426, 427, 99/447, 450, DIG. 14, DIG. 15, 444, 446; 126/390, 373; 220/458, 454, 660, 455, 912; 29/527.4, 527.2; 219/10.55 E

[56] References Cited

U.S. PATENT DOCUMENTS

| | | | |
|---|---|---|---|
| 254,141 | 2/1882 | Kenfield | 126/390 |
| 476,340 | 6/1892 | Wagandt | 99/DIG. 15 |
| 888,960 | 5/1908 | Clark | 99/422 |
| 1,447,813 | 3/1923 | Patrick | 99/425 |
| 1,460,380 | 7/1923 | Hughes | 99/425 |
| 1,781,302 | 11/1930 | Roberts | 99/DIG. 15 |
| 1,783,183 | 12/1930 | Dibble | 99/425 |
| 1,899,682 | 2/1933 | Goldenberg | 99/445 |
| 1,913,337 | 6/1933 | Manicke | 99/DIG. 15 |
| 3,407,723 | 10/1968 | Varkala | 99/445 |
| 3,509,814 | 5/1970 | Karapetian | 99/445 |
| 3,785,274 | 1/1974 | Yamamoto | 99/425 |
| 4,676,151 | 6/1987 | Gorsuch et al. | 99/450 |
| 4,768,427 | 9/1988 | Cheng | 126/390 |
| 4,785,968 | 11/1988 | Logan et al. | 220/912 |
| 4,926,843 | 5/1990 | Vock et al. | 99/422 |
| 5,004,121 | 4/1991 | Howe | 99/DIG. 14 |

FOREIGN PATENT DOCUMENTS

| | | | |
|---|---|---|---|
| 1126524 | 6/1982 | Canada | 99/DIG. 15 |
| 0214439 | 3/1987 | European Pat. Off. | 99/425 |
| 0246607 | 11/1987 | European Pat. Off. | |
| 0268186 | 5/1988 | European Pat. Off. | |
| 74873 | 12/1987 | Finland . | |
| 2415995 | 10/1979 | France | 99/425 |
| 46006 | 1/1929 | Norway . | |
| 60519 | 2/1939 | Norway . | |
| 44536 | 8/1917 | Sweden . | |

*Primary Examiner*—Timothy F. Simone
*Attorney, Agent, or Firm*—Young & Thompson

[57] ABSTRACT

Cooking vessel provided with an imperforate base (6) having a face (6a) adapted to be exposed to a heat source (2). This face has a series of substantially radial grooves (7) and is substantially free from non-radial grooves. The depth of the radial grooves is within the range of one-quarter to one-half the thickness of the vessel base (6).

15 Claims, 4 Drawing Sheets

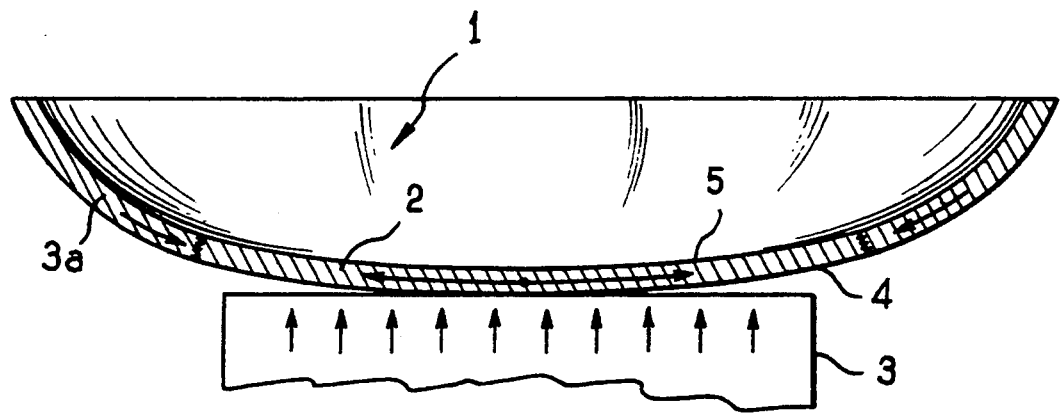
FIG_1
(PRIOR ART)
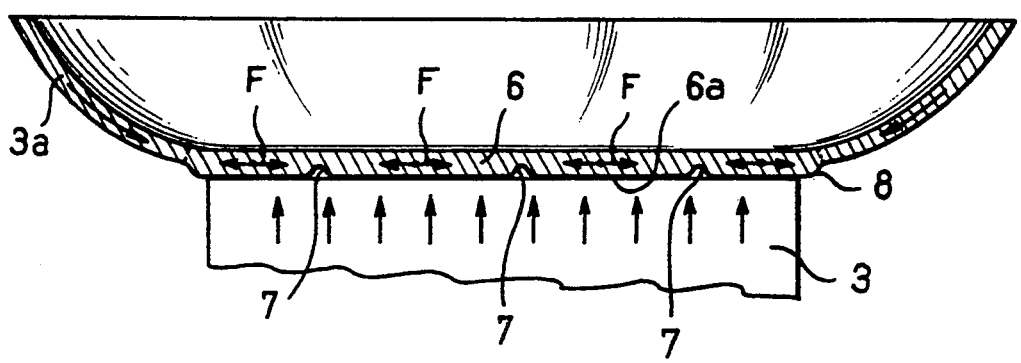
FIG_2

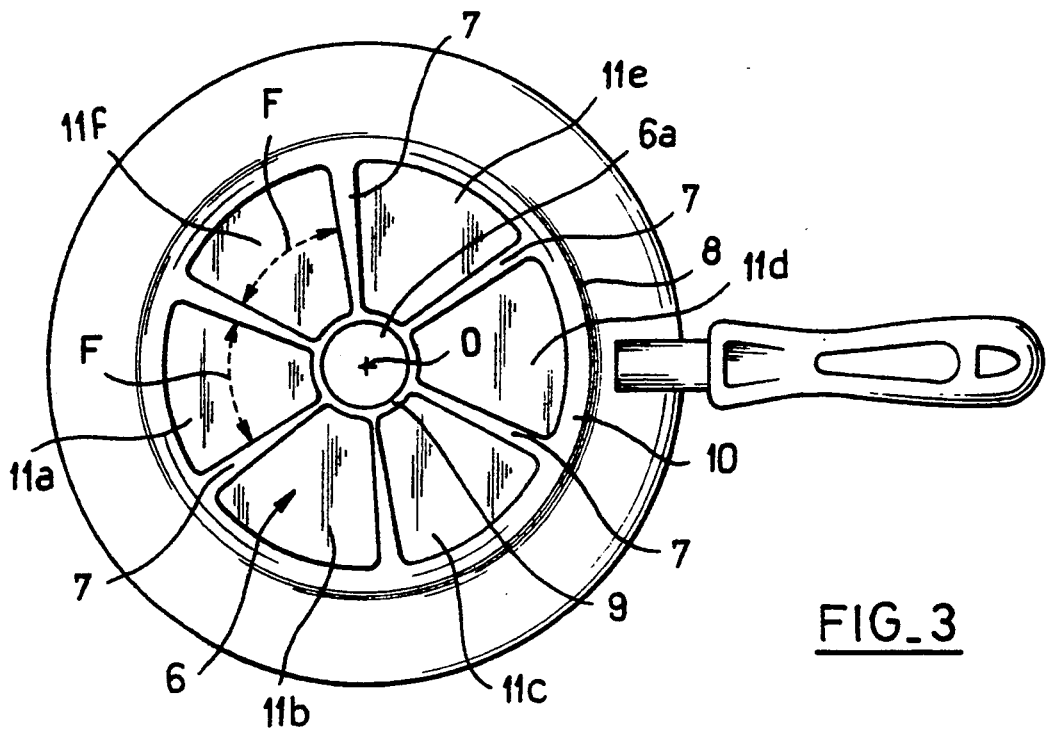
FIG_3
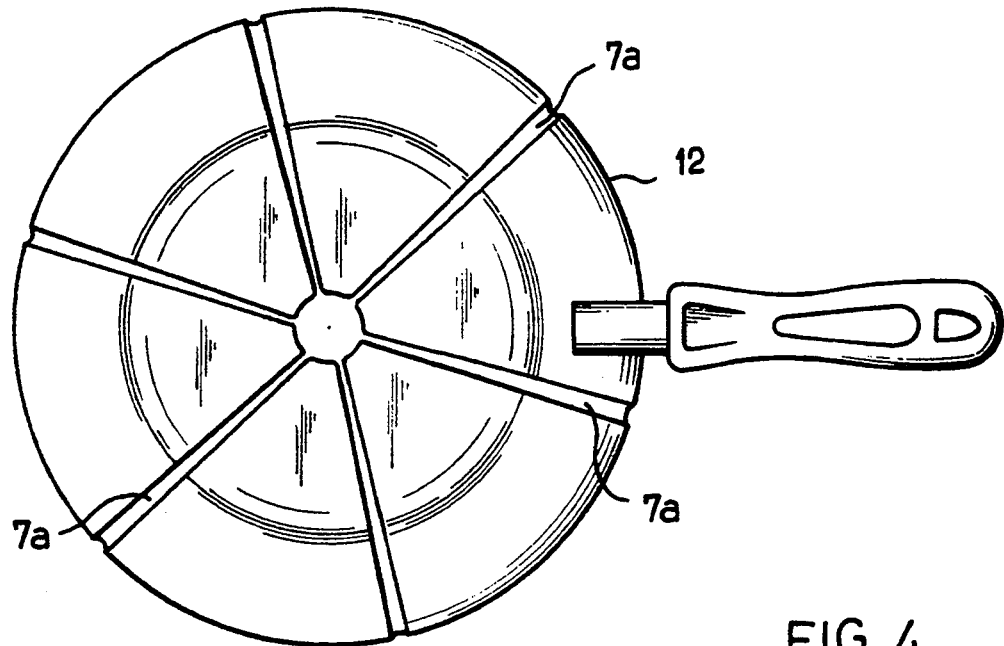
FIG_4

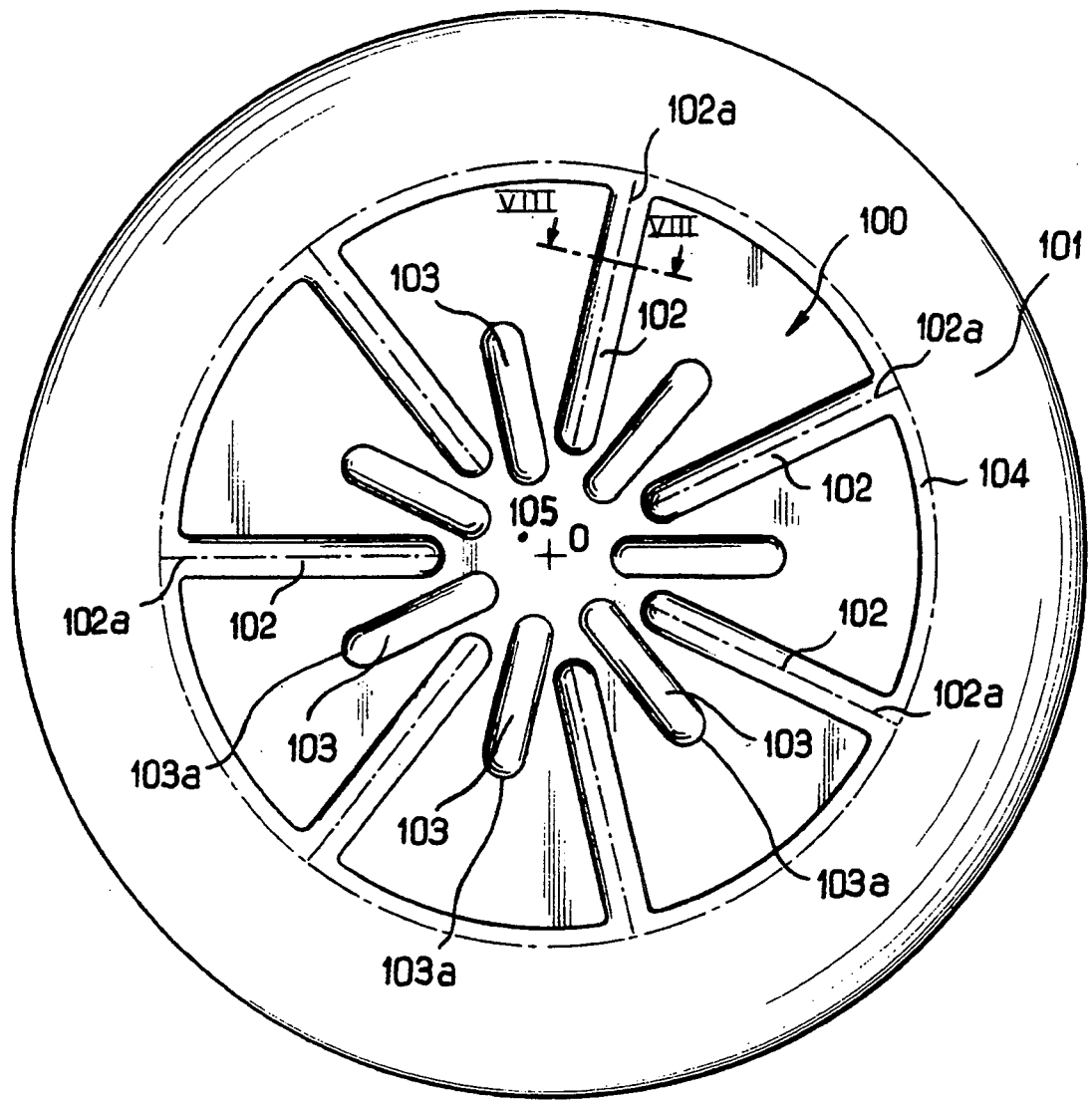
FIG_7
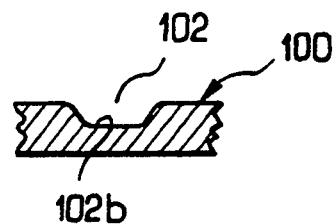
FIG_8

COOKING VESSEL HAVING A BASE WHICH IS NON-DEFORMABLE UNDER THE ACTION OF HEAT

This application is a continuation of U.S. application No. 07/776,399, filed Nov. 21, 1991, now abandoned.

FIELD OF THE INVENTION

The present invention relates to a cooking vessel having a base which affords resistance to deformation under the action of heat transferred by electric hotplates and gas burners.

The invention applies in particular to cooking vessels formed by die-stamping of an aluminum disk, such as fry-pans, saucepans, high-sided fry-pans and the like.

BACKGROUND OF THE INVENTION

It is known that the bases of cooking vessels, in particular when they have a relatively small thickness of the order of 2 to 4 mm, for example, have a tendency to deform under the action of the heat source which is applied on the external face of said base.

This deformation consists of bulging-out of the base, the convexity of which is directed towards the heat source.

This bulging-out is due to the fact that, when cooking is in progress, the external face of the vessel base which is directed towards the heat is brought to a temperature which is distinctly higher than that of the internal face of the vessel.

The difference between these temperatures is increased by the presence of foods within the vessel which reduce the temperature of the internal face of this latter. Thus it commonly happens that the external face of the base is heated to over 500° C. whereas the temperature of the internal face of the vessel does not exceed about one hundred degrees. As a consequence of this temperature difference, the metal expands to a greater extent in the zone adjacent to the external surface of the base than in the zone adjacent to the internal face. This accordingly results in bulging-out of the vessel base, the convexity of which is directed towards the heat source. This bulging-out is even more marked when the vessel is placed on a hotplate of cast-iron or of glass-ceramic material.

Bulging-out of the base of cooking vessels is subject to a number of disadvantages.

In the first place, bulging-out appreciably reduces the contact surface between the vessel base and the hotplate, thus resulting in waste of energy.

In the second place, bulging-out results in poor cooking conditions in view of the fact that fats and oils tend to accumulate at the center of the base instead of spreading uniformly over the internal surface of this latter.

In order to remedy the above-mentioned deformation, it has been proposed to employ cooking vessels having thick bases, that is to say bases having a thickness which attains the vicinity of 10 mm.

However, these thick-base vessels have the disadvantages of being costly, heavy to use, and of increasing cooking times since the thickness of these bases reduces the rate of heat transfer to foods.

OBJECT OF THE INVENTION

The object of the present invention is to overcome the disadvantages of known designs by producing a cooking vessel having a base which does not undergo deformation under the action of the heat transferred by electric hotplates and gas burners; this base can be relatively thin and in particular as thin as a conventional aluminum vessel base which is deformed under the action of heat.

SUMMARY OF THE INVENTION

In accordance with the invention, the cooking vessel provided with a base having a face which is intended to be exposed to a heat source is characterized in that said face has a series of grooves extending from the periphery of said base to the center of this latter, the depth and the width of these grooves being sufficient to make said base non-deformable under the action of the heat produced by said heat source.

Experience has shown that, when the vessel base has a sufficient number of such grooves and when the depth and thickness of these latter were sufficient, this base withstands the deformation produced by the heat of a hotplate of conventional type or of glass-ceramic material or of a gas burner.

This surprising result can be explained *a posteriori* as follows:

The above-mentioned grooves divide the vessel base into a certain number of zones which are joined to each other by the vessel-base metal only in the portion which is close to the internal face of the vessel. Thus, in the portion which is close to the external surface of the base, the metal located in the different zones separated by the grooves is capable of expanding freely along concentric circles having the same center as the base without producing any effect on the adjacent zones.

In other words, this expansion has the effect of reducing the width of the grooves without deforming, that is to say without causing bulging-out of the base.

This explanation shows that the width and the depth of the grooves are critical. This width must in fact be sufficient to ensure that the zones of metal separated by the grooves can expand freely with respect to each other. Thus the minimum width of the grooves could be calculated as a function of the coefficient of expansion of the metal employed and of the temperatures attained on the external and internal surfaces of the base.

The depth of the grooves is also critical. This depth must also be as great as possible without, however, reaching an extreme value above which the vessel base would no longer have sufficient mechanical strength.

The effect mentioned above is not observed when the vessel base is provided with concentric grooves in accordance with known practice in the present state of the technique.

In order to make the base non-deformable, the grooves must in fact intersect circles having the same center as the base.

In a preferred version of the invention, these grooves are substantially radial. Said grooves thus divide the vessel base into a series of zones which are substantially equal and uniformly distributed around the center of the base.

As will be readily apparent, these grooves can deviate from a radial direction and can have a curved shape instead of being straight.

Other particular features and advantages of the invention will also become apparent from the description given hereafter.

BRIEF DESCRIPTION OF THE DRAWINGS

In the accompanying drawings which are given by way of non-limitative example:

FIG. 1 is an axial sectional view of a conventional fry-pan placed on a hotplate and deformed under the action of the heat of a hotplate;

FIG. 2 is an axial sectional view of a fry-pan constructed in accordance with the invention;

FIG. 3 is a plan view showing the external face of the fry-pan base in accordance with the invention;

FIG. 4 is a plan view which is similar to FIG. 3 and shows an alternative embodiment of the invention;

FIG. 7 is a plan view of a fry-pan base corresponding to a preferred version of the invention;

FIG. 8 is a view in cross-section along the plane VIII—VIII of FIG. 9.

DETAILED DESCRIPTION OF THE INVENTION

Figure 5:
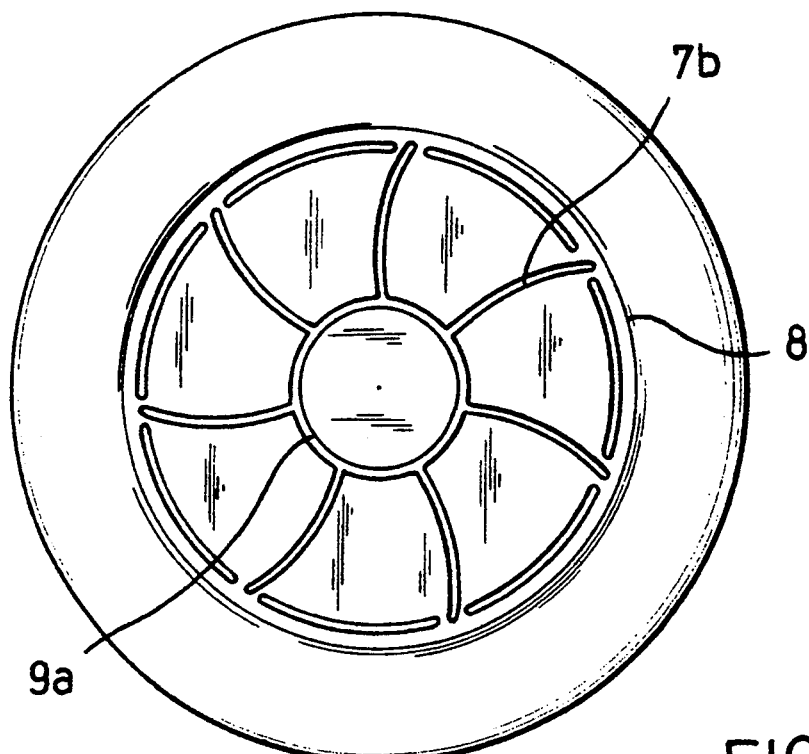
FIGS. 5 and 6 are plan views showing the external face of various alternative embodiments of the invention.

FIG. 1 shows a fry-pan 1, the base 2 of which is bulged-out under the action of heat generated by the hotplate 3 on which said base 2 rests.

This bulging-out of the base 2 results from the fact that it is surrounded by a ring of metal 3a which remains substantially cool and which prevents outward expansion of the base 2.

Moreover, when cooking is in progress, the external face 4 of the base 2 which is in contact with the hotplate 3 is brought to a temperature which easily attains 500° C. whilst the internal face 5 which is in contact with the food scarcely exceeds 100° C.

In consequence, the zone of metal adjacent to the face 4 expands to a greater extent than the zone adjacent to the face 5, with the result that the base 2 bulges-out as indicated in FIG. 1.

In order to prevent this bulging-out of the fry-pan base and without increasing the thickness of this latter, the face 6a of the base 6 of the fry-pan in accordance with the invention as illustrated in FIGS. 2 and 3 has a series of grooves 7 extending from the periphery 8 of said base 6 to the center O of this latter.

In the example illustrated in FIG. 3, the grooves 7 are radial and extend from a circular groove 9 having the same center 0 as the base 6 to another circular groove 10 formed at the periphery 8 of said base.

As will be evident from FIG. 3, the grooves 7 have side walls that are continuous from end to end thereof; and the same is true of the corresponding grooves in the embodiments that are the subject of the subsequent figures.

The circular groove 9 has a radius which is distinctly smaller than one-half the radius of the base 6.

The depth and the width of the grooves 7 are sufficient to make the base 6 non-deformable under the action of heat produced by the heat source 3.

Preferably, the depth of the grooves 7 is within the range of one-fifth to one-half the thickness of the fry-pan base 6.

The width of the grooves 7 is preferably within the range of one-quarter to twice the thickness of the base 6.

In the case of a fry-pan fabricated from aluminum sheet having a thickness within the range of 2.5 to 6 mm, the depth of the grooves 7 can be within the range of 0.5 to 3 mm and their width can be within the range of 0.6 to 15 mm.

The grooves 7 can readily be formed, preferably by die-stamping, but also by casting in accordance with shapes formed in the mold, or by machining.

As shown in FIG. 3, the width of the grooves 7 can increase in a regular manner between the center O of the base 6 and the periphery 8 of this latter.

The radial grooves 7 divide the base 6 of the fry-pan into a plurality of sectors 11a, 11b, 11c, 11d, 11e, 11f which are equal to each other.

The technical effects provided by the grooves 7 formed in the base 6 of the fry-pan are as follows:

- as a result of these grooves 7, the metal located near the heat source 3 is capable of expanding in the direction of the arrows F shown in FIG. 3,
- this expansion is "absorbed" by the width of the grooves 7, with the result that the sectors 11a, . . . 11f are capable of expanding freely with respect to each other,
- the result thereby achieved is that expansion of the sectors 11a, . . . 11f does not produce any deformation of the base on account of the hooping action of the peripheral ring 3a.

As already mentioned in the foregoing, the thickness of the grooves 7 can be determined by calculation in order to permit these latter to absorb the expansion. This thickness can also be determined by experiment.

The depth of the grooves 7 is dictated by the mechanical strength of the base 6, so that it is advisable to ensure that this depth does not exceed one-half the thickness of the base 6, especially when this latter is of aluminum and has a normal thickness of the order of 3 mm.

Preferably, the cross-section of the grooves 7 is flared-out in view of the fact that the heat expansion is greater at the external surface of the base 6 than in the zone located near the bottom of the grooves 7. This characteristic feature also facilitates cleaning of the grooves 7.

The invention thus makes it possible by means of a simple operation of die-stamping, machining or casting in accordance with the shapes of the mold to ensure that the bases of cooking vessels which normally deform readily, taking their thickness into account, are made non-deformable under the action of heat.

Figure 6:
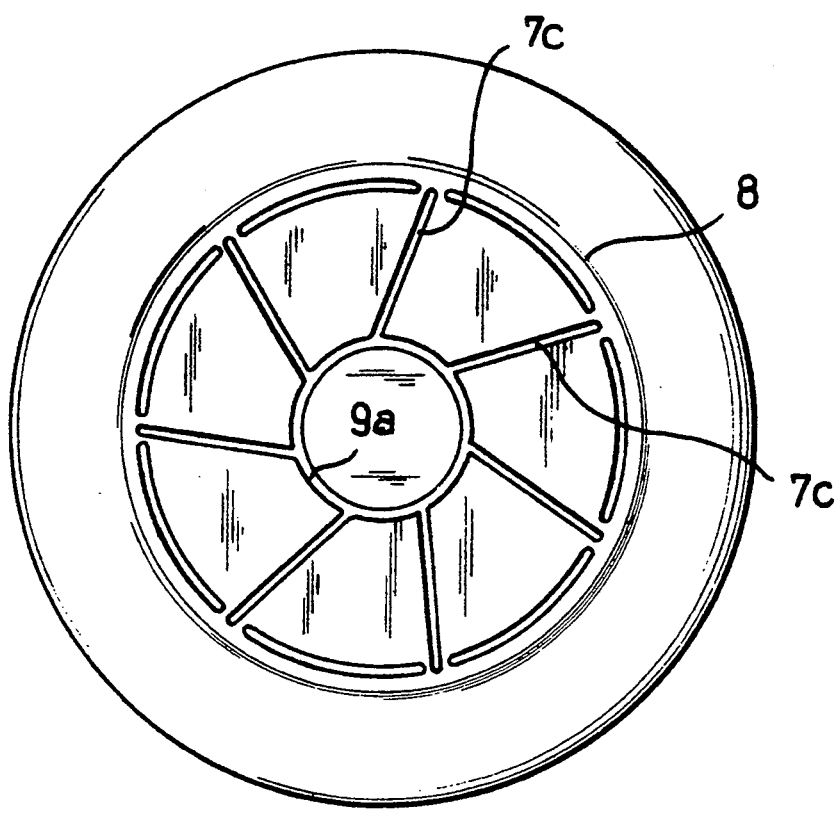

FIGS. 4 to 6 show alternative embodiments of the invention.

In the case of FIG. 4, the grooves 7a are also radial but extend to the outer edge 12 of the fry-pan.

In the variant illustrated in FIG. 5, the grooves 7b are not exactly radial but constituted by arcs extending from a circular groove 9a located near the center to the periphery 8 of the base. The ends of the grooves 7b are, however, located in radial directions.

In the case of FIG. 6, the grooves 7c are straight but inclined with respect to radial directions.

In the examples illustrated in FIGS. 5 and 6, the grooves 7b and 7c divide the base of the cooking vessels into zones in which the metal is capable of expanding without inducing any deformation.

As in the case of FIGS. 1 and 2, the grooves 7b and 7c can readily be formed by means of a die-stamping operation which has the advantage over machining in that it is carried out rapidly and does not involve any removal of metal.

The fry-pan illustrated in FIG. 9 has been fabricated by die-stamping an aluminum disk having a thickness which is usually within the range of 2.4 to 6 mm.

This fry-pan has a flat circular base 100 surrounded laterally by a side wall 101.

This circular base 100 has a first series of radial grooves 102 and the ends of said grooves which are remote from the center O of the base emerge, that is to say open on the lateral face 101 of the fry-pan.

A second series of grooves 103 is arranged between the first series of grooves 102. This second series of grooves 103 is shorter than the first and their ends 103a remote from the center O are closed.

A zone of metal 105 which is not provided with grooves extends around the center O.

In the embodiment illustrated in FIG. 7, the second series of grooves 103 is located at one-half the distance of the first series of grooves 102.

Moreover, the first series of grooves 102 opens at the ends 102a of these latter into a circular groove 104, the center of which coincides with the center O of the base 100. Furthermore, the grooves 103 each have one end which is closer to the center O than that of the grooves 102.

The number of grooves 102 of the first series is equal to seven. These grooves thus divide the base 100 into seven equal sectors limited at the periphery by the circular groove 104 and at the interior by the circular zone of metal 105.

The width of the grooves 102, 103 is within the range of 8 to 12 mm (preferably 10 mm) and their depth is within the range of 0.5 to 1.5 mm, the preferred depth of the long grooves 102 being equal to 1 mm and that of the shortest grooves 103 being 0.5 mm.

As shown in FIG. 8, the grooves 102 are flared outwards and the same applies to the grooves 103, their transverse cross-section being substantially trapezoidal. This shape can readily be obtained by die-stamping.

The width of the bottom 102b of the grooves 102 is preferably within the range of 2 to 4 mm, the optimum value being equal to 3 mm in accordance with the results of tests.

Tests have demonstrated that an aluminum fry-pan corresponding to the characteristics described in the foregoing afforded resistance to heat produced by a hotplate or a burner without any deformation, even when the base has a thickness as small as 2.4 mm. This result is obtained in particular by virtue of the presence of the short grooves 103 close to the center O.

It will be noted that a conventional die-stamped aluminum fry-pan having the same thickness becomes considerably deformed under the action of heat, which makes it incompatible for use on hotplates.

I claim:

1. Cooking vessel provided with an imperforate base having a uniform internal face adapted to be in contact with food and an external face adapted to be exposed to a heat source, said external face having a series of substantially radial grooves, the depth of said radial grooves being within the range of one-quarter to one-half the thickness of the vessel base and the width of said radial grooves being within the range of one-fifth to two-and-a-half times the thickness of the base, said radial grooves having side walls that are continuous from end to end of said radial grooves.

2. Vessel according to claim 1, characterized in that said grooves (7) divide the base into a plurality of substantially equal sectors (11a, . . . 11f).

3. Vessel according to claim 1, formed from a sheet of aluminum having a thickness within the range of 2.5 to 6 mm, characterized in that the depth of the grooves (7) is within the range of 0.5 to 3 mm and their width is within the range of 0.6 to 15 mm.

4. Vessel according to claim 1, characterized in that the grooves (7) are formed by die-stamping, casting or machining.

5. Vessel according to claim 1, characterized in that the width of the grooves (7) increases progressively from a center (O) of the base (6) to a periphery (8) of this latter.

6. Vessel according to claim 1, characterized in that these grooves (7) extend towards the periphery (8) from a circular groove (9) which has the same center as the base (6) and the radius of which is smaller than one-half the radius of said base (6).

7. Vessel according to claim 1, characterized in that the cross-section of the grooves (7) is flared outwards.

8. Vessel according to claim 1, characterized in that the base (100) has a first series of grooves (102) and the ends (102a) of said grooves which are remote from a center (O) of the base open on a lateral face (101) of the vessel, a second series of grooves (103) being arranged between the first series of grooves, this second series of grooves (103) being shorter than the first and their ends (103a) remote from the center (O) being closed.

9. Vessel according to claim 8, characterized in that the second series of grooves (103) is located at one-half the distance of the first series of grooves (102).

10. Vessel according to claims 8, characterized in that the number of grooves of the first series is equal to seven.

11. Vessel according to claims 8, characterized in that the width of the grooves (102, 103) is within the range of 8 to 12 mm and their depth within the range of 0.5 to 1.5 mm.

12. Vessel according to claim 8, characterized in that the width of the grooves (102, 103) is equal to 10 mm, the depth of the grooves of the first series being equal to 1 mm and that of the second series (103) being equal to 0.5 mm.

13. Vessel according to claim 8, characterized in that the grooves (102, 103) are flared outwards, their cross-section being substantially trapezoidal.

14. Vessel according to claim 13, characterized in that the width of the bottom (102b) of the grooves (102, 103) is within the range of 2 to 4 mm and preferably 3 mm.

15. Vessel according to claim 1, wherein said base between said radial grooves has a first thickness and said base at the bottom of said radial grooves has a second thickness, said first thickness being the sum of said second thickness plus said depth of said radial grooves.

* * * * *